J. WILDER.
TROLLEY WHEEL MOUNT.
APPLICATION FILED MAY 16, 1914.
1,130,359.
Patented Mar. 2, 1915.
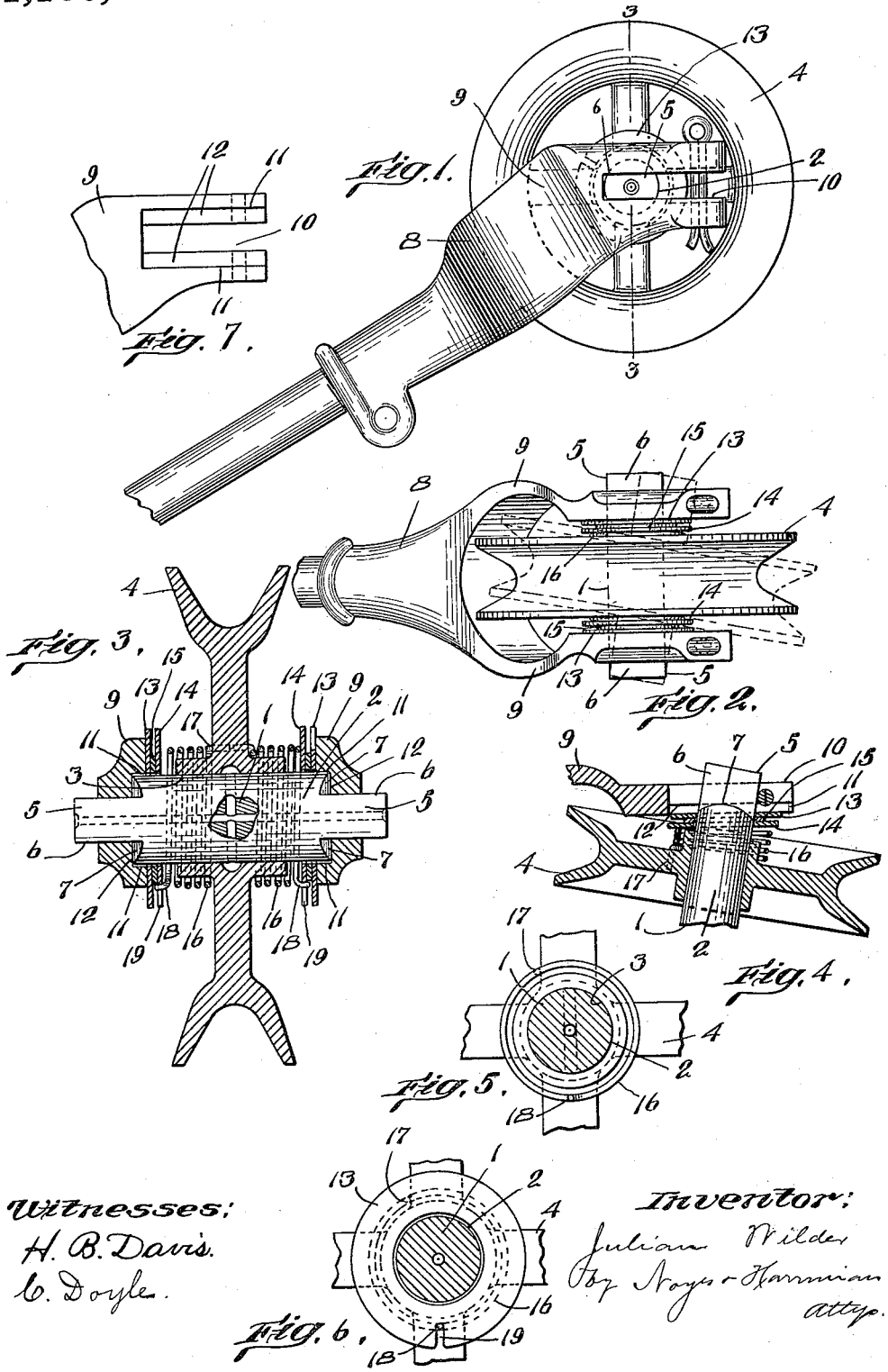

UNITED STATES PATENT OFFICE.

JULIAN WILDER, OF AUGUSTA, MAINE.

TROLLEY-WHEEL MOUNT.

1,130,359.　　　　Specification of Letters Patent.　　Patented Mar. 2, 1915.

Application filed May 16, 1914. Serial No. 839,143.

*To all whom it may concern:*

Be it known that I, JULIAN WILDER, a citizen of the United States, residing at Augusta, in the county of Kennebec and State of Maine, have invented an Improvement in Trolley-Wheel Mounts, of which the following is a specification.

The invention relates generally to an improvement in means for mounting a trolley wheel in the harp to provide for its positive movement with relation to and independently of the harp in operation.

The wear on a trolley wheel when fixed against other than independent rotative action with respect to the harp and incident to the curves of the trolley wire, materially reduces the life of the wheel and interferes to no little extent with an effective contact.

The present invention is designed with a view to freeing the wheel within the harp within limits of movement, so that the axle of the wheel is capable of different angular relations to the plane of the harp to compensate for the curvature of the trolley wire.

In its essential details, the present invention resides in forming the wheel axle to provide independent bearing portions and in constructing the harp arms to form bearing surfaces for coöperation with the bearing portions of the axle, the relative constructions insuring a comparatively free movement of the axle with relation to the harp to permit the axle to assume distinctive angular relations with the plane of the harp.

The invention in the preferred form of details will be described in the following specification, reference being had particularly to the accompanying drawings, in which:—

Figure 1 is a side elevation of the trolley wheel and harp. Fig. 2 is a plan view of Fig. 1. Fig. 3 is a transverse sectional view taken on dotted line 3—3, Fig. 1. Fig. 4 is a longitudinal sectional detail view of the trolley wheel and harp. Figs. 5 and 6 are detail views showing the arrangement of the springs and washers. Fig. 7 is a longitudinal sectional detail view showing the inner face of one of the harp arms.

In constructing the improved trolley wheel, the axle 1 is formed with what may be termed a bearing portion 2, corresponding in diameter to the bearing opening 3 in the trolley wheel 4, which wheel, aside from the details hereinafter noted may be of any usual or preferred construction.

The axle is formed to provide end portions 5 which are cut away on their upper and lower sections to provide square bearing faces 6. The faces 6 are in parallelism with each other and with the horizontal diametric line of the axle end, said end portions being otherwise in conformity with the size and shape of the axle. By reason of the cut-away faces 6, the axle proper above and below said portions presents what I term bearing shoulders 7, and these shoulders are rounded in plan, curving outwardly from their end edges toward their center, the curvature being of uniform radius and forming outwardly curved abutments above and below the bearing faces 6.

The trolley harp 8, which may be of any usual or preferred construction, is provided with the usual arms 9 arranged in spaced relation to receive the wheel 4 between them. For the purposes of the present invention, the arms 9 are formed with longitudinally extending channels 10, opening through the forward or free ends of the arms, and having their upper and lower walls spaced apart a distance corresponding to the distance between the respective bearing faces 6 of the axle. On the inner surfaces, the arms above and below the respective walls of the channels, are recessed at 11, the recessed portions opening from the inner surfaces of the arms and extending partly therethrough. The recesses coincide with the channels 10 forming in effect extensions of the channels on the inner sides of the arms, the distance between the upper and lower walls of the respective recesses of one arm approximating the diameter of the axle. The upright walls of the recesses 11, as at 12, provide bearing surfaces to receive the rounded bearings 7 of the axle.

Coöperating with the improved bearing, I utilize washers, and so arrange them as to prevent the possibility of their becoming wedged between the bearing faces of the axle and harp arms. To this end, I arrange on the axle, between the trolley wheel and harp arm, two washers 13 and 14, constituting inner and outer washers, and an interposed bearing washer 15. The washers 13 and 14 have an external diameter exceeding the width of the harp arm, while the interposed washer is of lesser external diameter, and all said washers have an internal diameter greater than the diameter of the axle. The bearing elements thus provided are detachably connected to the trolley wheel through the medium of a spring 16, coiled about the hub of the wheel and having its inner terminal 17 removably engaging a boss, or other appropriate element on the trolley wheel. The outer terminal 18 of the spring removably engages a radial slot 19 in the inner washer 13, thereby detachably connecting the bearing elements, and effectively maintaining their coöperation for bearing purposes.

It is to be particularly noted that the axle in its main portion seats within a recess in the harp arm, and that the bearing washers effectively close this recess, thereby preventing foreign substances from reaching the bearing of the axle, and that said washers are held in engagement with each other and in parallel relation against the arms of the harp by the spring, notwithstanding relative angular movement of the axle in the coöperation of the wheel with the trolley-wire. It is, of course, to be understood that the bearing channels in the harp arm are of considerable length, and that the axle is permitted free play therein, being prevented from escape from such bearing channel through cotter pins 20 passing through openings in the terminals of the arms and bridging said channels.

In use, it will be understood that the trolley axle, while held against independent rotation through the coöperation of the bearing faces 6 with the walls of the channel 10, are nevertheless permitted an independent movement incident to the coöperation of the trolley wheel with the curves of the trolley wire, by reason of the bearings 7 engaging the walls 12 of the recesses 11. The axle may thus assume practically any angle within the limit of its length, and hence insure a more effective coöperation of the wheel and wire and materially increase the life of the wheel in use.

I claim:—

1. A wheel mount comprising a harp member having undercut bearing channels, and a wheel axle coöperating with the harp and formed with independent bearing surfaces for coöperation with distinctive portions of said bearing channels.

2. A wheel mount comprising a harp member having undercut bearing channels opening through the ends of the arms and recesses opening from the inner sides of the arms and coinciding with the channels, and a wheel axle having squared portions to coöperate with the walls of the channels and rounded portions to coöperate with the walls of the recesses.

3. A wheel mount comprising a harp member having undercut bearing channels, a wheel axle having distinctive bearing portions to coöperate with independent surfaces of said channels, and washers closing the inner portions of said channels about the axle.

4. A wheel mount comprising a harp member having undercut bearing channels, a wheel axle having distinctive bearing portions to coöperate with independent surfaces of said channels, washers closing the inner portions of said channels about the axle, and means for removably connecting said washers to the trolley wheel.

5. A wheel mount comprising a harp member having undercut bearing channels, a trolley wheel, an axle therefor having distinctive bearing portions to coöperate with independent surfaces of said channels, washers closing the inner portions of said channels about the axle, and springs bearing between the washers and trolley wheel to maintain said washers in channel closing positions.

6. A cylindrical trolley axle having squared terminals and shoulders, the shoulders above and below said terminals being formed with rounded projections, in combination with a harp member having undercut bearing channels, the squared terminals of the axle having a sliding bearing between the walls of the channels and the rounded projections bearing against the walls of the undercut portions thereof.

7. A wheel mount comprising a harp member having undercut bearing channels, a cylindrical wheel-axle having squared terminals arranged to slide in said channels and rounded shoulders engaging the undercut portions thereof which form end-bearings for the axle, a set of washers arranged on the axle adjacent each arm of the harp, said washers having an inner diameter greater than the diameter of the axle, permitting angular movements of the axle with respect to the washers, and springs engaging a trolley-wheel arranged on the axle and the innermost washers of the sets, which act to assist in maintaining the wheel in parallel relation with the arms of the harp and also hold the washers of each set in engagement with each other and in parallel relation with the arms of the harp notwithstanding angular movements of the axle with respect thereto, substantially as described.

In testimony whereof, I have signed my name to this specification, in the presence of two subscribing witnesses.

JULIAN WILDER.

Witnesses:
 WALTER M. SANBORN,
 N. L. GOODELL.

Copies of this patent may be obtained for five cents each, by addressing the "Commissioner of Patents, Washington, D. C."